Patented Jan. 9, 1951

2,537,453

UNITED STATES PATENT OFFICE 2,537,453

CAPSULE FOR PRODUCING AN ALCOHOLIC BEVERAGE

Filippo Frangialli, Paris, France

No Drawing. Application April 13, 1948, Serial No. 20,843. In France April 23, 1947

4 Claims. (Cl. 99—78)

The present invention relates to a capsule for producing an alcoholic beverage and preferably a capsule having the general appearance of a bonbon or sweetmeat and particularly a liqueur bon-bon. The principal object is to provide a capsule so composed, in its envelope or casing and contents, that it only requires one or more to be dropped into a glass or cup or plain or aerated water to obtain, almost instantaneously, an alcoholic beverage having an odour, flavour and appearance very similar to those of a sparkling wine and more particularly a champagne wine.

A capsule according to the invention comprises, first, an envelope soluble in water and formed by a sweetener (sugar, glucose etc.), bicarbonate of soda, and possibly an agglomerant, and, second, a filling in the form of an alcoholate composed of ethylic alcohol of 96° B. to which are added: an acid capable of being absorbed by the drinker without inconvenience, as for example tartaric or citric acid, some drops of suitably chosen aromatic esters, and a colorant (generally a caramel). As the sweetener is insoluble in alcohol of 96° B. the envelope is not dissolved by the liquid of the filling and in practice it is found that this insolubility of the sweetener in the alcohol prevents the tartaric or citric acid from reacting upon the bicarbonate of soda incorporated in the envelope.

Upon contact with water, the sweetener dissolves and the envelope disintegrates and its components rapidly dissolve in the water whilst the liquid filling mixes with the water. There results a reaction of the acid upon the bicarbonate of soda which accelerates the disintegration of the capsule and eventually gasifies the water which is sweetened to the desired degree by the sweetener. The esters impart to the liquid the desired odour and flavour whilst the colorant tints it to the yellow gold colour characteristic of a champagne wine. Acid in excess imparts the necessary degree of acidity.

In one practical example, the filling comprises the following constituents:

Pure ethylic alcohol of 96° B _____ cm.³__ 10
Tartaric acid _____ gr ___ 2 to 5
Ethyl acetate _____ drops__ 2 to 5
Butanol acetate _____ do____ 1 to 2
Ethyl formate _____ do____ 1 to 2
A solution of 25 parts of ethyl pelargonate in 75 parts of pure ethylic alcohol _____ drops__ 1 to 2

The alcoholate filling thus prepared is coloured by a small quantity of caramelised sugar.

Preferably, the sweetener constituent of the envelope is a very fine sugar known as "farine sugar" for with this the disintegration of the envelope and the dissolution of the sugar are almost instantaneous. About 1 gr. of bicarbonate of soda is added. To the uninitiated the effect obtained appears magical. Taking a cup of plain water and dropping in a capsule, a lively effervescence is produced and in a few seconds the water is transformed into sparkling wine.

If the capsule is intended for dropping into water already strongly aerated or gasified, the envelope can be formed exclusively of the sweetener and the acid constituent of the filling is no longer indispensable. Nevertheless, there is retained in the filling a small proportion of acid and in the envelope a small proportion of bicarbonate of soda, the reaction of the acid upon the bicarbonate during the disintegration of the envelope having for effect the disengagement of a small quantity of carbonic acid. This disengagement disintegrates the envelope which then frees more rapidly its contents and itself dissolves more rapidly in the gasified water.

With a filling, like that above particularized, having a content of 10 cm.³ of pure ethylic alcohol of 96° B., it is possible to introduce 1 gr. of tartaric acid instead of 2 to 5 gr. and 0.3 gr. of bicarbonate of soda in the envelope instead of 1 gr.

It is to be understood that, if desired, the bicarbonate of soda may be omitted completely from the envelope but the result would not be so good because the disintegration would be slower and the surprise effect less successful. In all cases it is advantageous to retain a small quantity of the acid in order to impart to the beverage a desirable acidity.

Instead of providing a soluble envelope containing sugar and possibly bicarbonate of soda, there may be enclosed in a non-soluble envelope, as for example an ampoule of thin plastic material, or in a sealed bottle or container, a mixture similar to the mixture above particularized and composed, for example, as follows:

Pure ethylic alcohol of 96° B _____ cm.³__ 10
Tartaric acid _____ gr ___ 1
Ethyl acetate _____ drops__ 2 to 5
Butanol acetate _____ do____ 1 to 2
Ethyl formate _____ do____ 1 to 2
Solution of 25 parts of ethyl pelargonate in 75 parts of pure ethylic alcohol _____ drops__ 1 to 2 this being added to sweetened aerated water. There is then obtained, without any surprise effect, an alcoholic drink having an appearance and taste similar to those of a good sparkling wine.

It is to be understood that the dosage and the mixture of the aromatic esters indicated in the formulae, may be modified in order to change the aroma of the beverage.

What I claim is:

1. A capsule for producing an alcoholic beverage comprising a water-soluble envelope and a filling mixture contained in the envelope, the said envelope comprising essentially a sweetener insoluble in alcohol and bicarbonate of soda and the said filling mixture comprising ethylic alcohol, aromatic esters, a harmless acid and a colorant.

2. A capsule for producing an alcoholic beverage comprising a water-soluble envelope and a filling mixture contained in the envelope, the said envelope comprising essentially finely crushed sugar and 1 gr. of bicarbonate of soda and the said filling mixture having the following composition:

| | | |
|---|---|---|
| Pure ethylic alcohol of 96° B | cm.$^3$ | 10 |
| Tartaric acid | grams | 2 to 5 |
| Ethyl acetate | drops | 2 to 5 |
| Butanol acetate | do | 1 to 2 |
| Ethyl formate | do | 1 to 2 |
| Solution of 25 parts of ethyl pelargonate in 75 parts of pure ethylic alcohol | drops | 1 to 2 |

3. A capsule for producing an alcoholic beverage comprising a water-soluble envelope and a filling mixture contained in the envelope, the said envelope comprising essentially finely crushed sugar and 0.3 gr. of bicarbonate of soda and the said filling mixture having the following composition:

| | | |
|---|---|---|
| Pure ethylic alcohol of 96° B | cm.$^3$ | 10 |
| Tartaric acid | gram | 1 |
| Ethyl acetate | drops | 2 to 5 |
| Butanol acetate | do | 1 to 2 |
| Ethyl formate | do | 1 to 2 |
| Solution of 25 parts of ethyl pelargonate in 75 parts of pure ethylic alcohol | drops | 1 to 2 |

4. A capsule for producing an alcoholic beverage comprising a water-soluble envelope and a filling mixture contained in the envelope, the said envelope comprising essentially a sweetener insoluble in alcohol and a first reagent comprising a salt of carbonic acid harmless to the human organism, and the said filling mixture comprising ethylic alcohol, a second reagent comprising a fruit acid harmless to the human organism, aromatic esters and a colorant, the first and second reagents being reactive upon one another for release of carbonic acid gas and disintegration of the capsule when dropped in water.

FILIPPO FRANGIALLI.

REFERENCES CITED

The following references are of record in the file of this patent:

UNITED STATES PATENTS

| Number | Name | Date |
|---|---|---|
| 112,610 | Maloney | Mar. 14, 1871 |
| 1,777,367 | Hollins et al. | Oct. 7, 1930 |

OTHER REFERENCES

"The Chemical Senses," by R. W. Moncrieff, published 1944 by Leonard Hill, Lmtd., London, pages 187, 188, 352, 353 and 354.